Oct. 15, 1968 H. H. YANOW 3,405,814
WEATHER TENT FOR CARGO HATCHES
Filed May 19, 1965 8 Sheets-Sheet 3

FIG. 3.

INVENTOR.
HAROLD H. YANOW
BY
Schapp & Hatch
ATTORNEYS

Oct. 15, 1968     H. H. YANOW     3,405,814
WEATHER TENT FOR CARGO HATCHES
Filed May 19, 1965     8 Sheets-Sheet 4

INVENTOR.
HAROLD H. YANOW
BY
Schapp & Hatch
ATTORNEYS

INVENTOR.
HAROLD H. YANOW
BY Schapp & Hatch
ATTORNEYS

Oct. 15, 1968  H. H. YANOW  3,405,814
WEATHER TENT FOR CARGO HATCHES
Filed May 19, 1965  8 Sheets-Sheet 7

INVENTOR.
HAROLD H. YANOW
BY
*Schapp & Hatch*
ATTORNEYS

Oct. 15, 1968    H. H. YANOW    3,405,814
WEATHER TENT FOR CARGO HATCHES
Filed May 19, 1965    8 Sheets-Sheet 8

INVENTOR.
HAROLD H. YANOW
BY
Schapp & Hatch
ATTORNEYS

United States Patent Office 3,405,814
Patented Oct. 15, 1968

3,405,814
WEATHER TENT FOR CARGO HATCHES
Harold H. Yanow, 528 15th Ave.,
San Francisco, Calif. 94118
Filed May 19, 1965, Ser. No. 456,932
15 Claims. (Cl. 214—15)

This application relates to improvements in a weather tent for cargo hatches, and more particularly to removable structures intended to keep rain from falling through an open hatch during loading or unloading operations.

Whenever a cargo which must be kept relatively dry is being loaded into or unloaded from a ship, rainstorms present a serious problem. Many types of cargo cannot stand the entry of rain into the ship's hold, and unless the hatch is covered in such manner as to exclude rain, cargo loading and unloading operations must cease while tarpaulins or the like are arrayed in covering relation across the open hatch.

Halting of cargo loading and unloading operations is extremely expensive because every extra moment spent at dockside detracts from the earning capacity of the ship. Also, the longshoreman crews must be paid if they are called out, even though they may be idled by the necessity for sealing off the hatches during a rainstorm. This often puts the operator to the choice of paying a longshoreman crew for standing idle in case it does rain, or not hiring a crew and taking a chance that it will not rain and cargo loading or unloading operations could be resumed so as to cut down dockside time.

Attempts have been made to solve this problem by providing canvas awnings or tents positioned to keep most of the rain out of the open hatch and still permit cargo loading and unloading operations. The most widely used of these devices consists of a pair of large canvas flies supported in the rigging over the hatch in the manner of a double pitch tent roof. The flies are separated slightly to provide a slot accommodating passage of the cable used to transport the individual loads of cargo. To use this type of tent, it is necessary that the cable move along a straight line coincident with the slot. However, ships use several types of loading and unloading systems and the type of tent under discussion is not suitable for use with many of them. For example, many ships utilize shipboard cranes which revolve between a position overlying the hatch and a position overlying the adjacent dock. The cables of such cranes move through an arc and it is obviously impossible to utilize the previously described tent construction.

The present invention contemplates a tent-like structure which may readily be placed in covering position across an open hatch to keep out the rain. This structure includes a light-weight frame which may be easily and quickly assembled and disassembled and a flexible cover therefor. The structure is provided with one or more cargo loading and unloading openings or ports which are sized to accommodate standard cargo loads. The cargo openings or ports are provided with means for closing off the openings when not actually required and this means opens and closes automatically on demand.

The framework and cover are constructed in such manner as to permit their being stowed in a relatively small space aboard the ship and are also adapted for rapid assembly and installation by the ship's personnel should a storm blow up. The means for opening and closing the cargo openings is contemplated in several embodiments, each of which provides its own pecular advantages.

Accordingly, it is a principal object of the present invention to provide a hatch cover capable of preventing rain from entering while permitting cargo to be passed through the hatch.

Another object of the present invention is to provide a hatch cover or tent of the character described having an access port for loading and unloading cargo and in which said access port opens automatically when required and closes automatically when not required in order to provide maximum protection from entry of rain through the access port.

A further object of the invention is to provide a hatch tent of the character described in which the access port opens in response to a load of cargo approaching the access port.

A still further object of the invention is to provide a hatch tent of the character described in which the access port is opened and closed automatically by and in accordance with the movement of the cargo transporting apparatus.

Yet another object of the present invention is to provide a hatch tent as described in which the access port is opened by the load and thereafter closes automatically as the load clears the access port.

Another object of the invention is to provide a hatch tent as described in which the access ports are normally closed off by door members yieldably mounted for displacement to open position by the load.

Another object of the invention is to provide a temporary hatch tent or cover for preventing rain from entering a ship's hold while permitting cargo to be passed therethrough, with the structure being stowable in a small area aboard ship, in knocked-down form, so as to be quickly available whenever threatening weather is encountered during cargo loading and unloading operations.

Another object of the present invention is to provide a temporary hatch tent or cover of the character described which is simple, sturdy, and designed to be set up in place or knocked down for stowage by relatively unskilled workers in a short space of time.

A further object of the invention is to provide a device of the character described which, when in use, is supported entirely on the deck of the ship rather than in the rigging.

Yet another object of the invention is to provide a device of the character described which is adapted for use with any and all types of cargo loading and unloading systems in which the load of cargo is lowered into or raised out of the hold through a deck hatch by means of a cable.

Further objects and features of advantage will become apparent as the specification proceeds and from the drawings, in which.

While I have shown only the preferred forms of my invention, it should be understood that various changes or modifications may be made within the scope of the claims hereto attached without departing from the spirit of the invention.

Referring to the drawings in detail, it will be seen that the weather tent for cargo hatches of the present invention basically comprises tent means 21 formed and adapted for removable mounting across an open hatch 22 and having one or more cargo access openings 23 therethrough, together with closure means 24 normally closing off the cargo openings 23 and formed for opening in response to the movement of the load 26 of cargo toward and through the opening 23.

As here shown, the tent means 21 includes a framework 27 adapted for removable mounting over the hatch 22 and a flexible cover 28 supported on the framework 27 for keeping rain out of the hatch. The cover 28 is formed to provide the cargo access openings 23 which are preferably of square shape, as shown, and which are just large enough to comfortably accommodate the largest horizontal dimension of standardized cargo loads.

The closure means 24 is here shown as having one or more flattened members adapted to span the opening 23 so as to exclude the rain, with the flattened members being movable from the opening to permit passage of cargo as required. In this broad sense, the closure means may be said to comprise door means having door panels which are slidable or swingable out of the opening.

In the form of the invention illustrated in FIGURES 1 through 9, the tent means 21 is of double pitch configuration, that is, the tent means 21 is formed to provide a flattened double pitch roof sloping downwardly toward the forward and aft ends of the hatch from a peak laterally traversing the hatch medially thereof. The cargo access openings or ports 23 are formed through the roof of the tent means 21 adjacent to the forward and aft ends of the hatch halfway between its opposite sides. This double pitch configuration and doubling of the cargo access openings is particularly suited for use on ships where multiple cargo hoisting devices will be utilized for each hatch. It should be apparent that if the hatches were large enough additional cargo access openings and their associated closure means could be provided. It also should be obvious that a single pitch tent roof having a single cargo access opening and associated closure means could be provided where desired.

The closure means 24 includes door panels 29 slideable between an extended position substantially covering the cargo access openings 23 and a retracted position withdrawn from such openings, together with actuating means 31 connected to the door panels and operative to move same between their extended and retracted positions for selectively blocking entry of rain into the ship and permitting entry and egress of cargo through the openings 23.

The actuating means 31 here consists of cables 32 reeved through pulleys 33, carried on framework 27, and connected at one end to the door panels 29. The pulleys 33 are supported on the ridge pole 34 of framework 27 in such manner that pulling on the cable 32 will draw the door panels 29 from their extended positions covering openings 23 to their retracted positions withdrawn from such openings. The door panels 29 are supported for the described sliding movement in guideways 36 positioned on opposite sides of the openings 23 and extending therefrom to the ridge pole 34.

FIGURES 1, 2, 3, 4, 6 and 7 are particularly concerned with a slideable door structure utlizing a single door panel 29. As may best be seen in FIGURES 6, 7 and 9, the guideways 36 are of generally box-shaped cross-section and the door panels 29 slide upon upwardly turned flanges 37 formed by cutting away the upper halves of the confronting sides of the guideways 36. Preferably, the door panels 29 are very light in weight so they will be free to slide along the guideway flanges 37.

Figure 8:
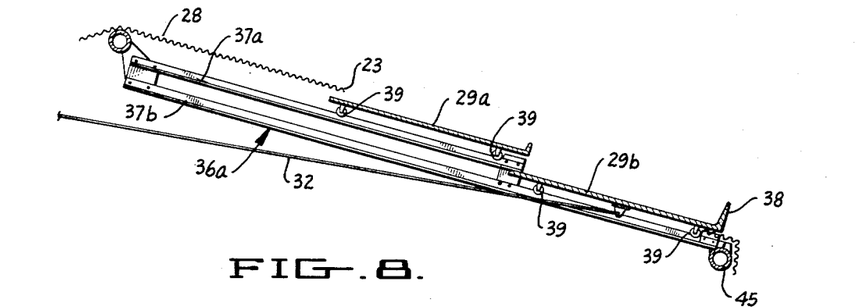
FIGURE 8, a view taken similarly to that of FIGURE 6 but illustrating a modified form of the invention having multiple sliding door panels.
Figure 9:
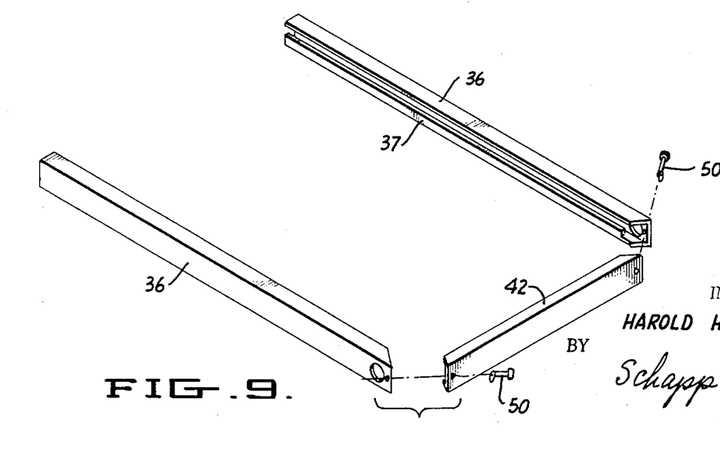
FIGURE 9, an exploded perspective view of a portion of the framework of the hatch tent of the present invention.

FIGURE 8 is concerned with a sliding door panel construction in which a pair of door panels 29a and 29b are supported on and extend between guideways 36a. The cable 32 is connected to the lower panel 29b which is provided with an upstanding member 38 adapted to engage the lower end of panel 29a so that pulling on cable 32 will draw both door panels from the openings to their retracted position. This structure is particularly suitable for comparatively small hatches wherein the required size of opening 23 does not leave room between the opening and the ridge pole of similar size into which the door may be retracted. FIGURE 8 also illustrates the panels 29a and 29b being supported on rollers 39 running on vertically spaced members 37a and 37b which may comprise flanges or other well-known configurations carried by the guideways 36a.

In both the single and double sliding door constructions, it is desirable to channel away the rain water in such manner that as little as possible will enter the hatch through the hatch tent when the door panels are in their closed position. As may best be seen in FIGURES 6 and 7 of the drawings, the door panel 29 is provided with an upturned lower edge 41 to define a kind of gutter. Rain water landing on the door panel, either directly from the skies or from the area of the tent uphill of the door panel, will flow down the door panel to the gutter and will then flow to the opposite sides of the panel and into the interior of the box-shaped guideways 36. A transverse member 42 of similar cross-sectional shape extends between the lower ends of the guideways 36 and is secured thereto by quick-release fasteners 50, see FIGURE 9. A pair of drain tubes 45 extend laterally from the member 42 and are communicated therewith for draining off the rain water to discharge outside of the hatch rim.

As a feature of the present invention, the sliding door constructions shown in FIGURES 1 through 9 of the drawings are adapted to be actuated automatically by the rotary swinging movement of ship loading cranes. In this connection, it should be observed that the present invention is suitable for use with any type of cargo loading and unloading apparatus in which the cargo is supported in separate loads on a cable. In use with apparatus other than rotating cranes, the cable 32 would be pulled upon by conventional power-operated winches. However, when used with rotating cranes, the extra winches may be dispensed with and automatic operation achieved. This is accomplished by securing the ends of cable 32 directly to the rotating portion, usually the base 43, of the cranes 44 in the manner illustrated in FIGURE 1 of the drawings. As the crane swings toward a position where its cable 46 is aligned with the center of opening 23, the cable 32 will be wound onto the crane base 43 by an amount just sufficient to move the door panels 29 to their retracted position. Likewise, as the cranes 44 swing from this position, the cable 32 will be unwound from the crane base 43 and the door panels will be permitted to slide down to their extended position, blocking off the openings 23.

In order to facilitate this action, the door panels 29 and 29a and 29b are at all times urged toward their extended positions by means which may be overcome by the aforesaid winding up of cable 32 on crane base 43. As may best be seen in FIGURE 3 of the drawings, this means may conviently consist of a counterweight 47 secured to the door panels by a cable 48.

Figure 10:
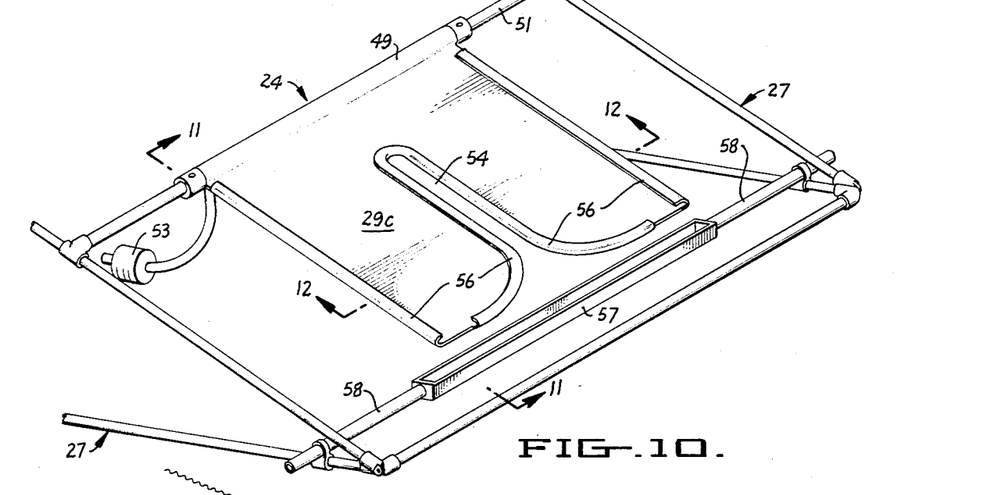
FIGURE 10, a perspective view of a portion of the framework constructed in accordance with the present invention and having a modified form of door means.
Figure 11:
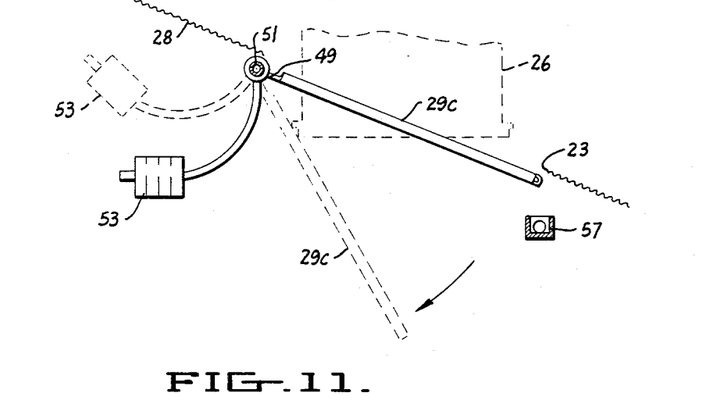
FIGURE 11, a vertical cross-sectional view taken substantially on the plane of line 11—11 of FIGURE 10.
Figure 12:
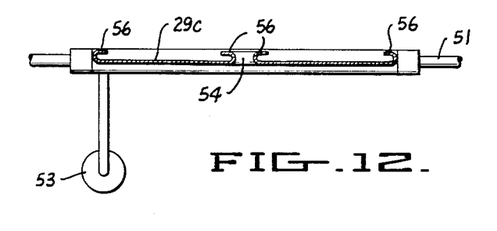
FIGURE 12, a vertical cross-sectional view taken substantially on the plane of line 12—12 of FIGURE 10.

A modified form of the closure means 24 is illustrated in FIGURES 10 through 14 of the drawings in which the closure means consists of one or more door panels which are swingably mounted so they may be physically pushed out of the way by the load of cargo 26 when passing through the opening 23 in either direction. FIGURES 10 through 12 are particularly concerned with a closure means of this type having a single door panel 29c hingedly supported at its upper edge 49 on a tube 51 carried by the framework 27. The door panel 29c should be relatively rigid and lightweight so it will be effective in keeping rainwater from entering the cargo access opening 23 in the tent, but at the same time will offer as little resistance as possible to being displaced from the opening by the ascending or descending load of cargo.

The door panel 29c is provided with means for returning it to its normal extended position closing off the opening 23 from the retracted position to which it has been displaced by the load of cargo. As shown in FIGURES 10 through 12, this means preferably consists of a counterweight 53 rigidly secured to the door panel 29c for swinging movement therewith, with the counterweight being supported on a side of the pivot tube 51 opposite to the door panel 29c. As the door panel 29c moves downwardly under the influence of the load of cargo 26 (as depicted by the dotted lines in FIGURE 11), the counterweight 53 swings upwardly under the tent cover 28. This increases the effective weight of the counterweight in proportion to the door panel and causes the door panel to swing back to its normal extended position as soon as the restraint imposed by the cargo load 26 is removed. When the door panel 29c is swung upwardly, the counterweight 53 moves to the right, as viewed in FIGURE 11, again changing the effective weight ratio on opposite sides of the pivot tube 51 so as to cause the door panel 29c to swing back downwardly to its normally extended position as soon as the cargo load 26 is out of the way.

As a valuable feature of the present invention, the type of closure means 24 illustrated in FIGURES 10 through 14 of the drawings may be returned to its closed position as soon as the load of cargo has cleared the cargo access openings 23. For this purpose, the door panel 29c is provided with a slot 54 which will accommodate the cargo load supporting cable 46 when the load of cargo is in the hold of the ship. Preferably, the corners of door panel 29c defined by its lower edge and the edges of the slot 54 are rounded in such manner as to lead the cable 46 into the slot 54 as the door panel 29c swings back upwardly to its normally extended position, closing off the cargo access opening 23.

As here shown, the door panel 29c is stamped out of a sheet of lightweight metal and is provided with turned-back edges 56 which increase the strength at the edges, reduce wear, and help in channeling the rainwater down the panel to discharge into an open, elongated box-like structure 57 provided at its ends with laterally extending drain tubes 58.

Figure 14:
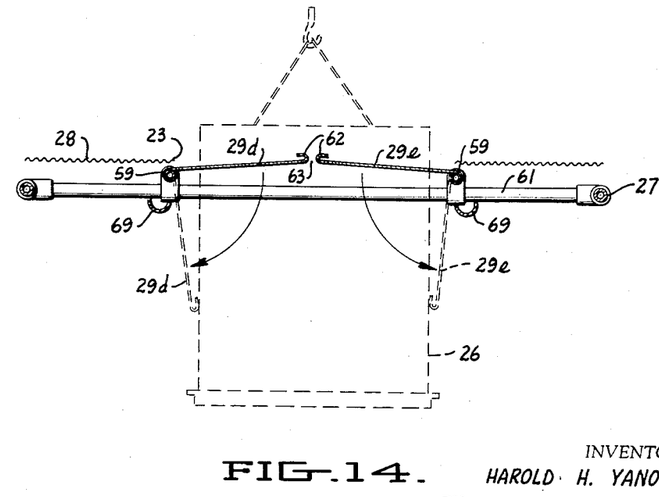
FIGURE 14, a vertical cross-sectional view taken substantially on the plane of line 14—14 of FIGURE 13.

FIGURES 12 and 14 are particularly concerned with a swingable-type closure 24 utilizing a pair of door panels 29d and 29e hingedly supported along the side edges of the opening 23 by means of pivot tubes 59 carried by laterally extending tubes 61 which are in turn supported by the framework 27. The confronting, swinging edges 62 of door panels 29d and 29e terminate a few inches short of each other to provide a cable accommodating slot 63 therebetween. As in the case of door panel 29c, door panels 29d and 29e are preferably formed with rolled-back edges 64 for reasons similar to those advanced in connection with the roller-back edges 56 of door panel 29c.

Figure 13:
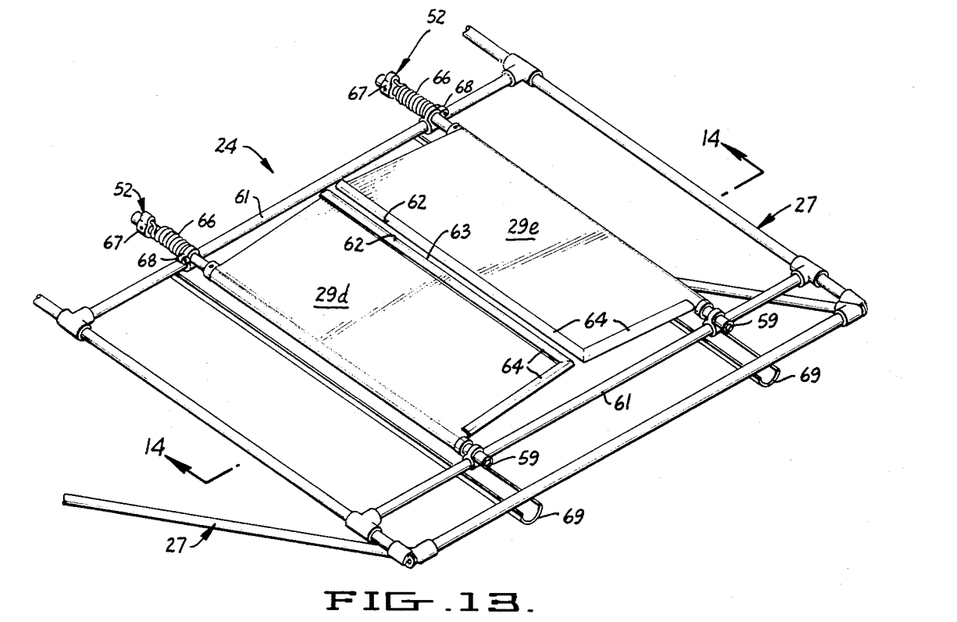
FIGURE 13, a perspective view similar to that of FIGURE 10 but illustrating a modified form of swinging door having two door panels.

As shown in FIGURES 13 and 14, the return means 52 preferably consists of coiled torsion springs 66 carried on extensions of the pivot tubes 59. One end of the torsion spring 66 is secured to the tube 59 by engaging the end of the spring in an opening in a collar 67 fixedly attached to tube 59 and by inserting the opposite end of the torsion spring 66 in an opening provided in the connector 68 which is secured to tube 61 and journals pivot tube 59. The torsion spring 66 is formed and proportioned so that the door panels 29d and 29e will assume the positions illustrated in FIGURES 13 and 14 when free to do so. It will be noted that the panels 29d and 29e slant upwardly slightly toward the slot 63 so that any load of rainwater may be accommodated without displacing the door panels downwardly to an unwanted extent. This also facilitates runoff of the rainwater to gutters 69 which carry the runoff clear of the hatch.

As the load 26 descends through opening 23, it automatically pushes the door panels 29d and 29e downwardly until they have swung out of the way a distance sufficient for the load to pass. As soon as the load has cleared the distal edges 62 of the door panels, the door panels swing upwardly to their normal position illustrated in solid lines in FIGURE 14.

As a load ascends out of the hold of the ship, it engages the undersides of the door panels 29d and 29e and displaces them upwardly out of the way in a similar manner. Likewise, as soon as the load has passed, the door panels are urged back down to their normal position by the torsion springs 66.

Figure 15:
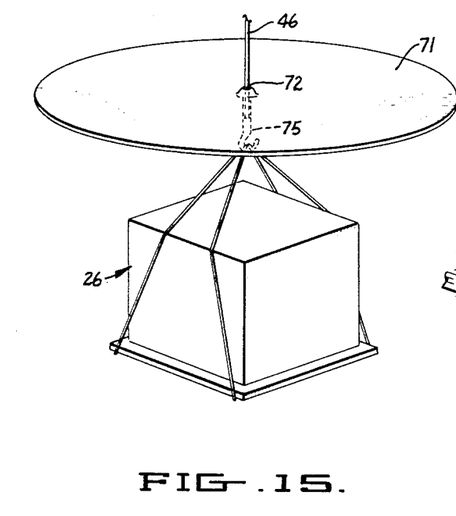
FIGURE 15, a perspective view of a cargo sling having a load of cargo thereon and a rain shield carried by the supporting cable.
Figure 16:
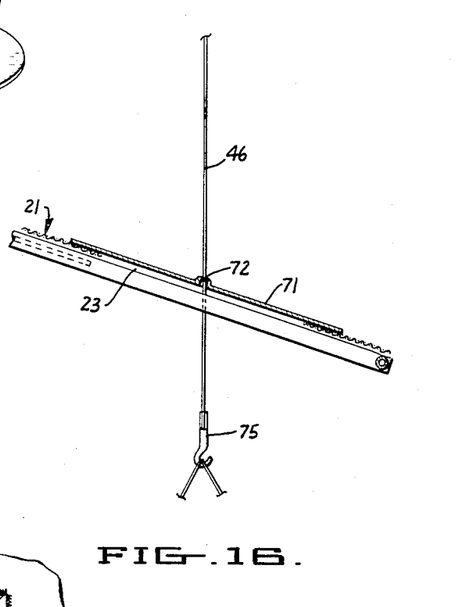
FIGURE 16, a fragmentary vertical cross-sectional view through the cargo access opening of a hatch tent constructed in accordance with the present invention and illustrating the rain shield of FIGURE 15 in operative association therewith.

Under certain conditions, it is desirable to provide means for sealing off the cargo access opening 23 from the entry of rain whenever a load of cargo is being moved. Likewise, it is often desirable that the load of cargo be protected from rain even during its movement between the ship and the dock. A device for performing this function is illustrated in FIGURES 15 and 16, wherein a circular flattened shield 71 is provided at its center with an opening 72 so that the shield can be mounted for sliding movement on the cargo load cable 46. FIGURE 15 illustrates how the shield 71 acts to guard the load of cargo 26 from being rained upon during transit between the ship and the dock and FIGURE 16 illustrates how the shield settles down upon the tent means 21 in covering relation to the cargo access opening 23 when the load of cargo is lowered into the hold. As the load of cargo rises from the hold, a suitable enlargement on the cable 46, such as the usual hook 75, engages the underside of the shield and supports it in the position illustrated in FIGURE 15.

Figure 17:
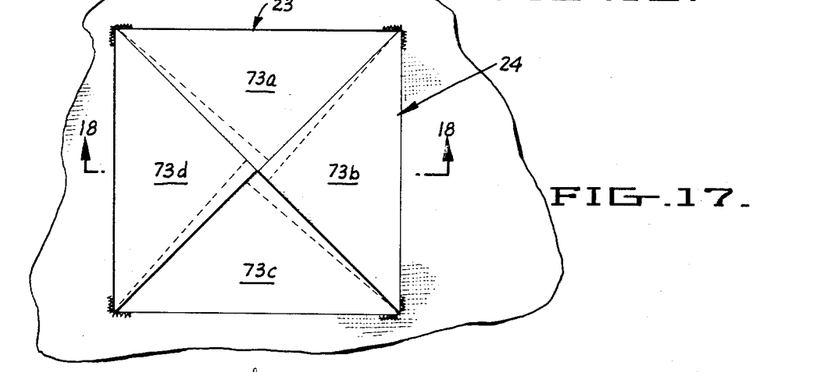
FIGURE 17, a fragmentary plan view of the cargo access opening of a hatch tent constructed in accordance with the present invention and having a modified form of closure.
Figure 18:
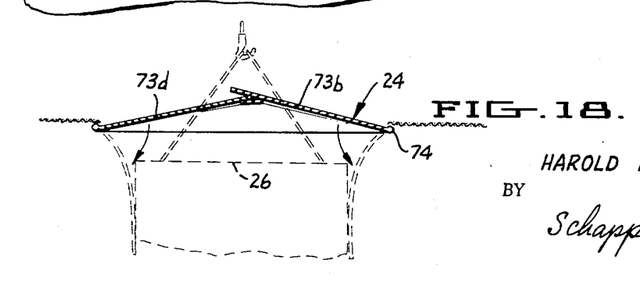
FIGURE 18, a vertical cross-sectional view taken substantially on the plane of line 18—18 of FIGURE 17.

A third form of the closure means 24 is illustrated in FIGURES 17 and 18 of the drawings. In this form of the invention, the closure means 24 consists of resilient panels 73a, 73b, 73c and 73d which provide a dilatable opening through which the load of cargo may pass. As may be seen from FIGURE 17, the panels 73a through 73d are preferably secured to and supported by a sub-frame 74 supported by the framework 27. Each of the panels is of triangular shape and the panels are formed in proportion to overlap somewhat as they extend toward the center of the opening.

Preferably, the panels are formed of heavy industrial rubber or the like in order to withstand the wear imposed by the cargo forcing its way through the opening. If desired, the panels may be provided with a flexible core and, of course, could be formed of any other suitable material possessing the desired characteristics.

As may be seen from FIGURE 18 of the drawings, as the load of cargo 26 descends through the opening 23, it will displace the resilient panels 73a through 73d downwardly so as to swing them back out of the way. As soon as the load has cleared the ends of the panels, they will, by reason of their own resilience, swing back to their original position. Likewise, as the load is lifted through the opening, the resilient panels will be swung upwardly in a similar manner and will snap back into their normal position as soon as the load has cleared.

Figure 5:
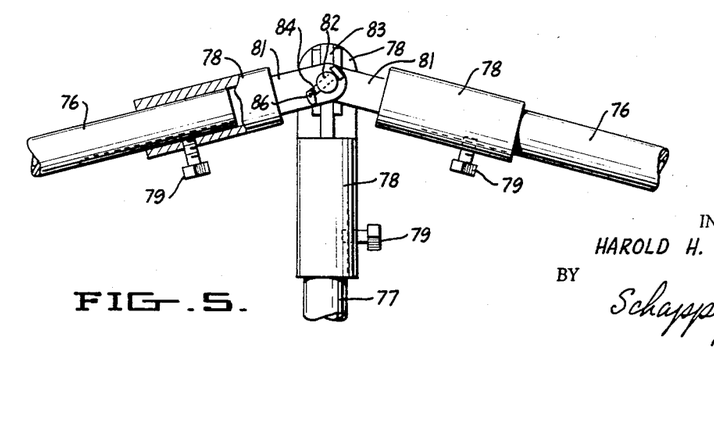
FIGURE 5, an enlarged fragmentary view taken substantially on the plane of line 5—5 of FIGURE 4 and having portions broken away and shown in section for clarity of illustration.
Figure 6:
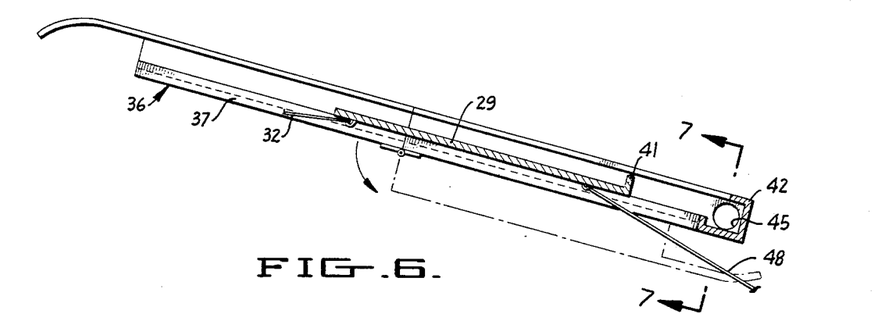
FIGURE 6, an enlarged vertical cross-sectional view taken substantially on the plane of line 6—6 of FIGURE 4.
Figure 7:
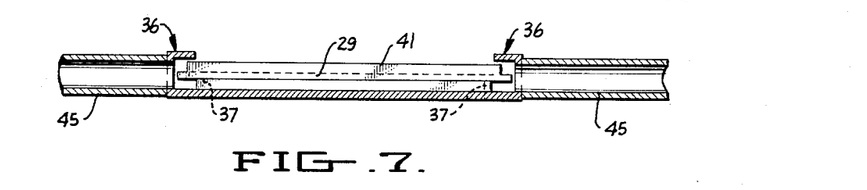
FIGURE 7, a vertical cross-sectional view taken substantially on the plane of line 7—7 of FIGURE 6.

In accordance with the present invention, the tent means is adapted to be knocked down for stowage in a comparatively small area aboard the ship. For this purpose, the framework 27 preferably consists of a plurality of tubes of the requisite length joined together by quickly-releasable connecting devices. FIGURE 5 illustrates a typical structure of this type. The connector shown in FIGURE 5 is that designed to join the ridge pole 34 to the downwardly slanting tubes 76 which define the outer edges of the roof of the tent means.

As here shown, the ends of the tubes 76 and the end of a vertical support tube 77 are engaged in sockets 78 and are secured therein by set screws 79. Likewise, the end of ridge pole 34 is engaged in a corresponding socket 78. Extensions 81 are secured to and extend from the opposite ends of the sockets 78 and, as shown in FIGURE 5, are journaled on a rod 82 secured to an extension 83 which is in turn rigidly secured to the sockets 78 which receive tubes 34 and 77. A pin 84 is inserted through a hole formed in the end of rod 82 to act in the manner of a cotter key. The pin 84 is preferably provided with a swiver head 86 which will hold it in place but which can be swung parallel with the shank of pin 84 to permit easy withdrawal from the opening in rod 82.

The lower end of tube 77 engages in a fitting 87 which also provides sockets for receiving the ends of horizontal tubes 88. The outer ends of horizontal tubes 88 are secured to the outer ends of tube 76 by similar type fittings 89.

Figure 1:
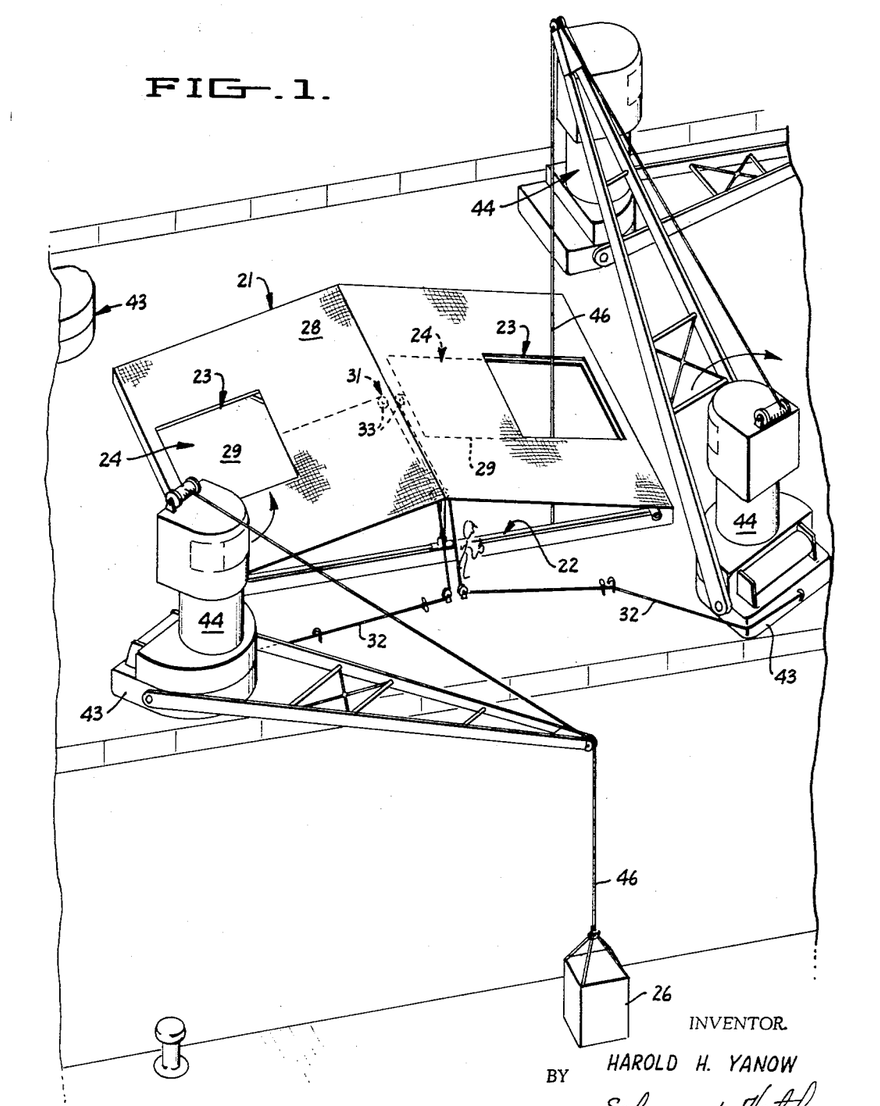
FIGURE 1 is a perspective view of a fragmentary portion of a ship and illustrating a hatch tent constructed in accordance with the present invention and installed in operating position.
Figure 2:
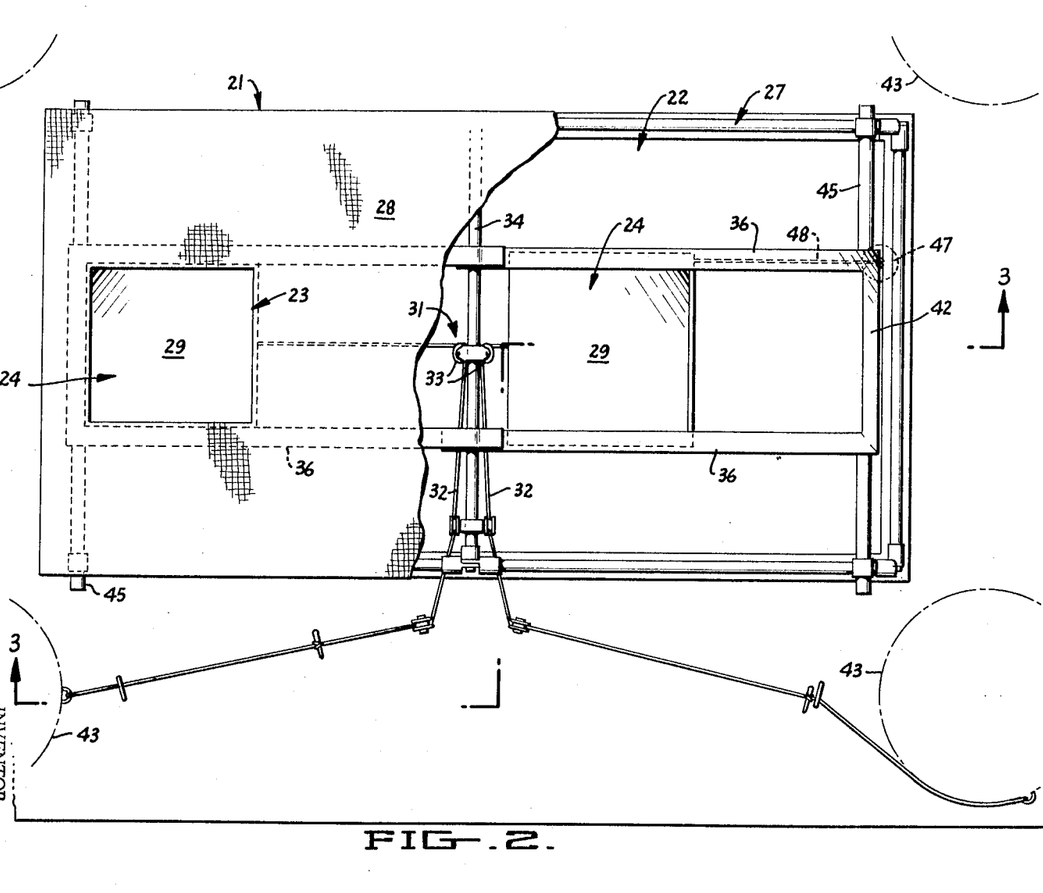
FIGURE 2, an enlarged plan view of the hatch tent and associated equipment of FIGURE 1, with a portion of the tent cover being broken away to reveal additional structure.
Figure 3:
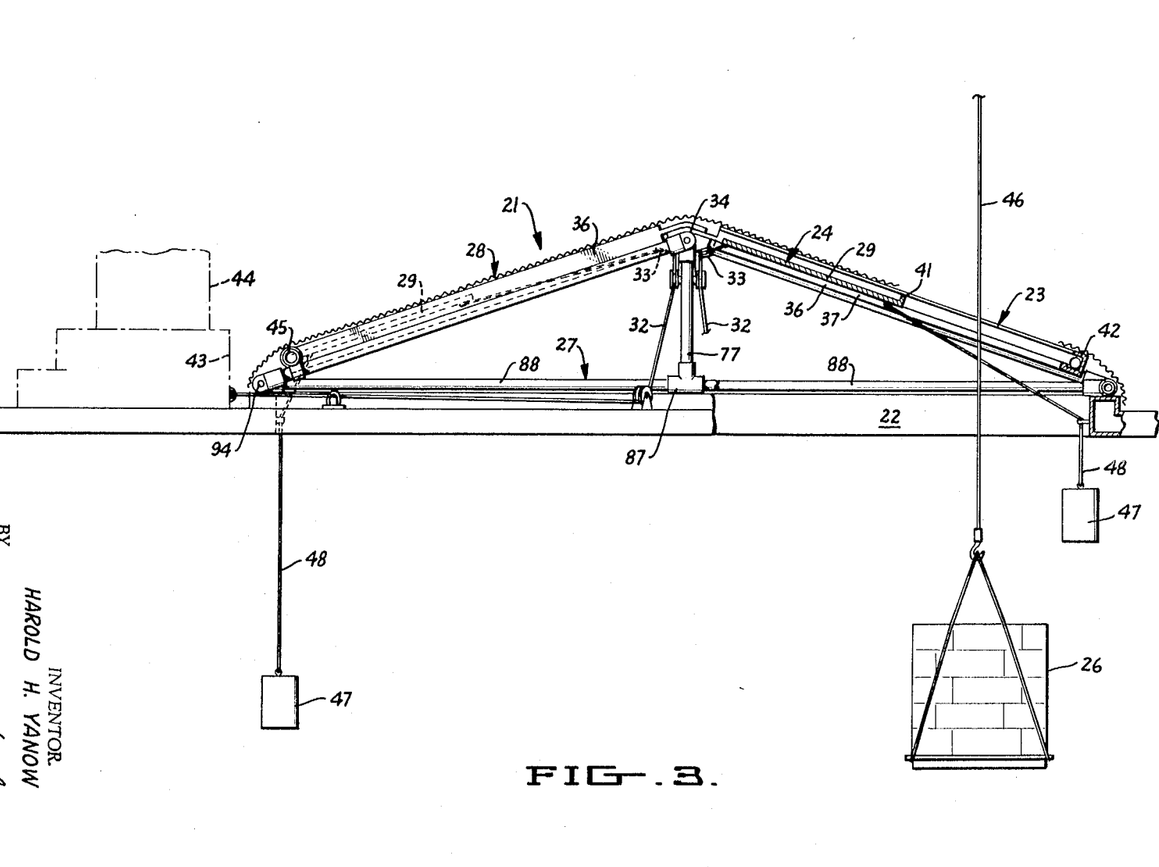
FIGURE 3, a vertical cross-sectional view taken substantially on the plane of line 3—3 of FIGURE 2.
Figure 4:
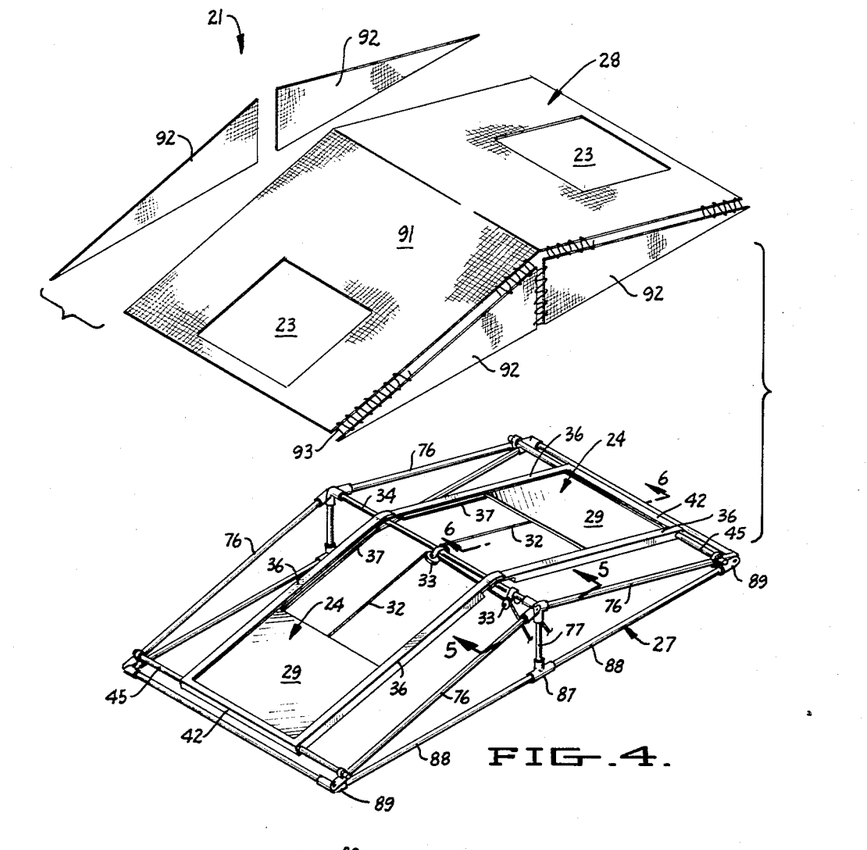
FIGURE 4, an exploded perspective view of the hatch tent of FIGURE 1.

The tend cover 28 is preferably formed out of five or more panels of canvas, rubberized canvas, sheet plastic, or the like. As shown in FIGURE 4, the cover 28 includes a main panel 91 which provides the entire roof of the tent and has the openings 23 cut therethrough, together with four triangular end panels 92. The panels 91 and 92 are preferably fastened together by means of grommeted lacings indicated at 93. With this construction, any of the end panels 92 may be eliminated and the panel 91 laced directly to the tubes 76 so as to provide clear vision for the operator of the cargo loading and unloading apparatus.

Of course, the main panel 91 may be provided in two or more sections, if desirable from a weight or handling standpoint. However, it is preferred to utilize a single panel 91 in order to facilitate the rapid assembly and disassembly of the tent. With the structure shown herein, it is possible to either take the framework and tent panels apart, or to merely collapse the framework around the pivots, such as those shown in FIGURE 5 and at 94 in FIGURE 3.

From the foregoing, it will be seen that I have provided a novel and valuable temporary hatch cover or tent capable of preventing rain from entering a ship's hold through its open hatches during cargo loading and unloading operations, and which will not substantially interfere with such operations. It will also be apparent that the apparatus of the present invention may be incorporated into and used with covers for other hatch-like openings through which it is desired to have individual loads ascend or descend. Thus, the present apparatus could be used with ships or barges, storage buildings or tents on land, and other structures of similar character.

I claim:

1. In combination with cargo moving apparatus, a hatch tent, comprising a framework adapted for removable mounting over a ship's hatch, a flexible cover supported on said framework for keeping rain out of said hatch and having an opening therethrough for loading and unloading cargo, and door means normally closing off said opening, said door means having a door actuating mechanism operatively connected to said cargo moving apparatus for automatic opening and closing in accordance with the position of the cargo so as to permit such cargo to pass therethrough.

2. In combination with cargo moving apparatus, a hatch tent, comprising a framework adapted for removable mounting over a ship's hatch, a flexible cover supported on said framework for keeping rain out of said hatch and having an opening therethrough for loading and unloading cargo, and door means mounted on said framework for movement between a first position closing off said opening in said cover and a second position providing access for cargo through said opening, said door means having a door actuating means constructed for operative connection to said cargo moving apparatus for movement from said first position to said second position upon approach of the cargo handling part of said cargo moving apparatus toward said opening and for movement from said second position to said first position upon retreat of the cargo handling part of said cargo moving apparatus away from said opening.

3. The combination as described in claim 2, and wherein said cargo is lowered and raised through said hatch on a cable, and a shield is adapted to be carried for slideable movement on the cable above the cargo, said shield being formed to rest on said tent and substantially cover said opening as the cable passes downwardly therethrough.

4. In combination with cargo moving apparatus, a hatch tent, comprising a framework adapted for removable mounting over a ship's hatch, a flexible cover supported on said framework for keeping rain out of said hatch and having an opening therethrough for loading and unloading cargo, means normally closing off said opening and formed for opening in response to the approach of cargo so as to permit such cargo to pass therethrough, said means including door means slidable between an extended position substantially covering said opening and a retracted position withdrawn from said opening, and actuating means connected to said door means and said cargo moving apparatus, said actuating means being responsive to movement of said cargo moving apparatus to move said door means between said extended and retracted positions for selectively blocking entry of rain and permitting entry of cargo through said opening.

5. In combination with cargo moving apparatus, a hatch tent, comprising a framework adapted for removable mounting over a ship's hatch, a flexible cover supported on said framework for keeping rain out of said hatch and having an opening therethrough for loading and unloading cargo, a pair of guideways supported by said framework on opposite sides of said opening and extending therefrom, and a door carried by said guideways for sliding movement therealong between a first position extending across said opening and a second position retracted therefrom in response to movement of said cargo moving apparatus.

6. The combination as described in claim 5, and wherein said guideways are positioned below said flexible cover.

7. The combination as described in claim 5, and wherein said framework is formed to support said flexible cover with its upper surface slanted to provide a pitched roof for facilitating runoff of rainwater.

8. The combination as described in claim 5, and wherein said door consists of a plurality of panels carried by separate guideways and formed to cover said opening when in said first position and to be stacked vertically when in said second position.

9. In combination with cargo moving apparatus, a temporary hatch cover for preventing rain from entering a ship's hold while permitting cargo to be passed therethrough, comprising tent means formed and adapted for removable mounting across an open hatch and having a cargo opening therethrough, closure means normally closing off said cargo opening, and actuating means for operating said closure means, said actuating means being operatively engageable with said cargo moving means for automatically opening the closure means in response to the movement of a load of cargo toward and through said opening.

10. The combination as described in claim 9, and wherein said tent is of double pitch configuration and is formed with said cargo opening and closure means on each side of the tent.

11. In combination with cargo moving apparatus, a temporary hatch cover for preventing rain from entering a ship's hold while permitting cargo to be passed therethrough, comprising tent means adapted for covering an open hatch and having a cargo port therethrough, door means, and actuating means constructed foro perative engagement with said cargo moving apparatus for selectively opening and closing said cargo part.

12. In combination with cargo moving apparatus, a temporary hatch cover for preventing rain from entering a ship's hold while permitting cargo to be passed therethrough, comprising tent means adapted for covering an open hatch and haivng a cargo port therethrough, door means, and actuating means constructed for operative engagement with said cargo moving apparatus for selectively opening and closing said cargo port; said tent means comprising a framework having triangular ends joined by a central ridge pole, and a cover panel of flexible sheet material detachably supported on said framework.

13. The combination as described in claim 12, and wherein elongated members are joined together by connector devices to provide said framework, and wherein said connector devices are detachable from said elongated members whereby said framework may be disassembled for stowing between uses.

14. In combination with cargo moving apparatus, a temporary hatch cover for preventing rain from entering a ship's hold while permitting cargo to be passed therethrough, comprising tent means adapted for covering an open hatch and having a cargo port therethrough; a plurality of door panels carried by said framework and formed to extend across and cover said cargo port, said door panels being movable to a retracted position affording freedom of passage of cargo through said port, and actuating means constructed for operative engagement with said cargo moving apparatus for selectively opening and closing said cargo port.

15. In a ship having a swingable cargo loading crane; an automatically opening hatch tent, comprising a framework adapted for removable mounting over a ship's hatch, a flexible cover supported on said framework for keeping rain out of said hatch and having an opening therethrough for loading and unloading cargo, door means mounted on said framework for movement between a first position closing off said opening in said cover and a second position providing access for cargo through said opening, and actuating means for selectively moving said door means between said first and second positions, said actuating means including a cable entrained around pulleys carried on said framework and connectable to said door means and said swingable cargo loading crane, the connection of said cable to said crane being such that the cable is wound onto the crane as the latter swings toward the hatch pulling said door means to its open second position and the cable is unwound from said crane as the latter swings away from the hatch permitting said door means to move to its closed first position.

References Cited

UNITED STATES PATENTS

| | | | |
|---|---|---|---|
| 615,222 | 11/1898 | Keech | 187—65 |
| 1,237,841 | 8/1917 | Tetzlaff | 114—202 |
| 1,856,658 | 5/1932 | Rummler. | |
| 1,960,860 | 5/1934 | Allen | 160—188 |
| 2,844,117 | 7/1958 | MacGregor et al. | 114—202 |
| 3,199,519 | 8/1965 | Ross | 135—6 |

FOREIGN PATENTS 295,046  1/1929  Great Britain.

ROBERT G. SHERIDAN, *Primary Examiner.*